(12) United States Patent
Baw et al.

(10) Patent No.: US 11,069,962 B2
(45) Date of Patent: Jul. 20, 2021

(54) ANTENNA ASSEMBLY FOR PORTABLE RADIO

(71) Applicant: MOTOROLA SOLUTIONS, INC., Chicago, IL (US)

(72) Inventors: Andy K. Baw, Barrington, IL (US); Jody H. Akens, Weston, FL (US); Eduardo Moralejo, Miami, FL (US); Adam R. Zelko, Arlington Heights, IL (US)

(73) Assignee: MOTOROLA SOLUTIONS, INC., Chicago, IL (US)

(*) Notice: Subject to any disclaimer, the term of this patent is extended or adjusted under 35 U.S.C. 154(b) by 197 days.

(21) Appl. No.: 16/227,776

(22) Filed: Dec. 20, 2018

(65) Prior Publication Data

US 2020/0203815 A1    Jun. 25, 2020

(51) Int. Cl.
*H01Q 1/24* (2006.01)
*H01Q 1/36* (2006.01)

(52) U.S. Cl.
CPC ............... *H01Q 1/36* (2013.01); *H01Q 1/24* (2013.01)

(58) Field of Classification Search
CPC .. H01Q 1/24; H01Q 1/22; H01Q 1/36; H01Q 1/242; H01Q 1/243; H01Q 1/44; H04M 1/03; H04M 1/035
See application file for complete search history.

(56) References Cited

U.S. PATENT DOCUMENTS

| 6,177,883 | B1 | 1/2001 | Jennetti et al. |
| 6,300,910 | B1 * | 10/2001 | Kim ................ H01Q 1/084 343/702 |
| 6,424,300 | B1 * | 7/2002 | Sanford ............ H01Q 1/243 343/700 MS |
| 6,924,770 | B2 * | 8/2005 | Carpenter ......... H01Q 1/243 343/700 MS |

(Continued)

FOREIGN PATENT DOCUMENTS

| JP | H0799403 | 4/1995 |
| JP | 2004172764 A | 6/2004 |

(Continued)

OTHER PUBLICATIONS

International Search Report & Written Opinion dated Mar. 13, 2020 for corresponding International Application No. PCT/US2019/063014 (15 pages).

*Primary Examiner* — Tho G Phan
(74) *Attorney, Agent, or Firm* — Michael Best and Friedrich LLP

(57) ABSTRACT

An antenna assembly for a portable radio includes a removable speaker cover having a plurality of speaker ports and an antenna mounting aperture extending through the removable speaker cover. The antenna assembly also includes a sheet metal antenna element coupled to the removable speaker cover along at least one of a top or side surface of the removable speaker cover, the sheet metal antenna element having a jogged portion that extends into the antenna mounting aperture. The antenna assembly also includes a (Continued)

contact plate disposed below the removable speaker cover and aligned with the antenna mounting aperture. The contact plate is coupled to the jogged portion to provide an electrical connection between the contact plate and the jogged portion.

25 Claims, 8 Drawing Sheets

(56) References Cited

U.S. PATENT DOCUMENTS

| | | | | |
|---|---|---|---|---|
| 7,197,345 | B2* | 3/2007 | Kim | H04M 1/0214 |
| | | | | 455/575.1 |
| 7,916,087 | B2* | 3/2011 | Wen | H01Q 1/38 |
| | | | | 343/700 MS |
| 8,660,623 | B2* | 2/2014 | Man | H01Q 1/38 |
| | | | | 455/575.5 |
| 2008/0001832 | A1 | 1/2008 | Murakami et al. | |
| 2009/0312069 | A1* | 12/2009 | Peng | H01Q 1/243 |
| | | | | 455/572 |
| 2013/0070952 | A1 | 3/2013 | Mai et al. | |
| 2014/0184451 | A1 | 7/2014 | Kuo | |

FOREIGN PATENT DOCUMENTS

| | | |
|---|---|---|
| JP | 2013106286 | 5/2013 |
| KR | 101254242 B1 | 4/2013 |
| WO | 2015/085539 A1 | 6/2015 |

* cited by examiner

ANTENNA ASSEMBLY FOR PORTABLE RADIO

BACKGROUND OF THE INVENTION

Radio devices such as, for example, two-way radios, land mobile radios, and the like are often subjected to contact with water. The radio devices are therefore sealed, and typically include at least one internal antenna element disposed within the sealed radio, adjacent to a printed circuit board (PCB).

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
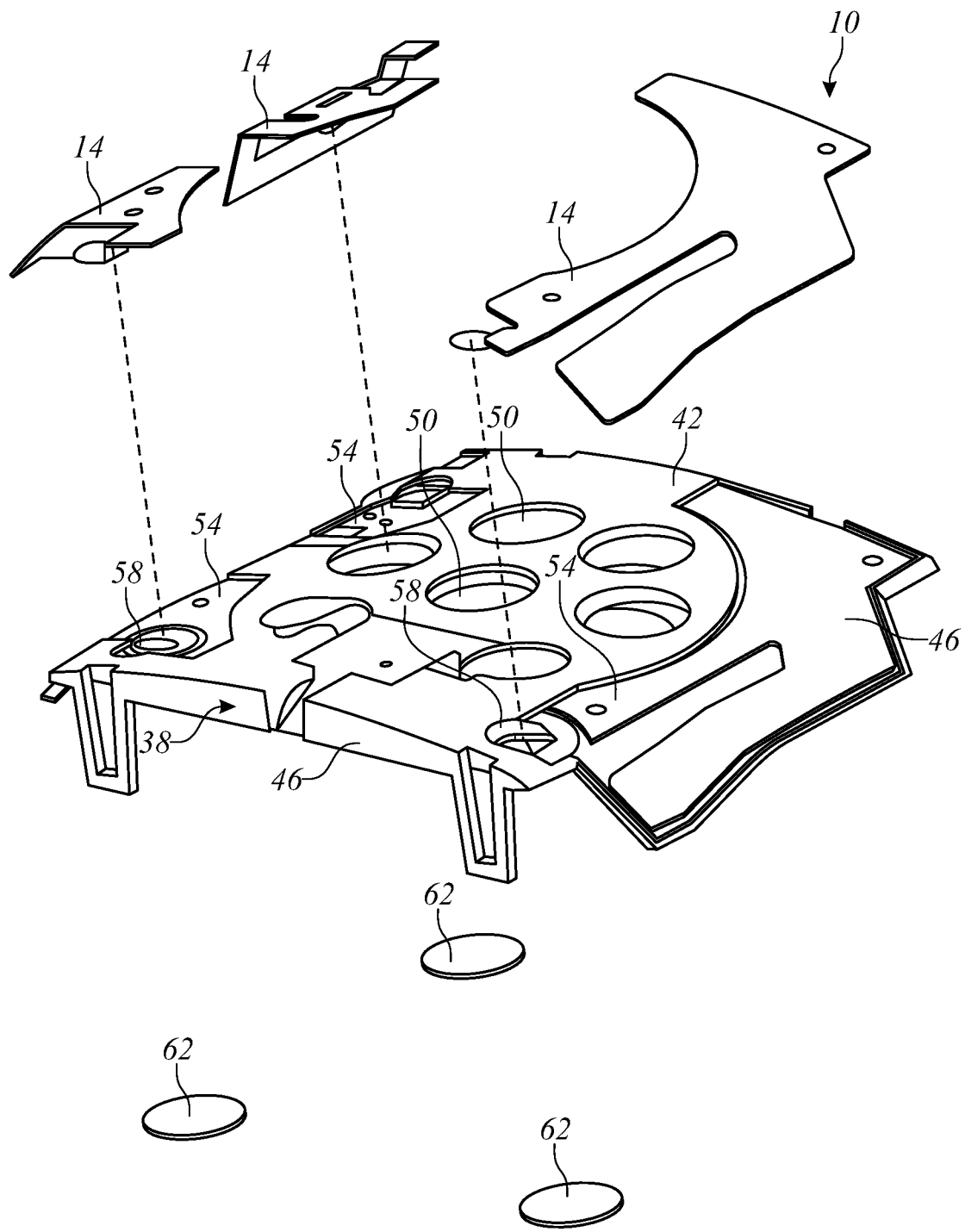
FIG. 1 is a perspective, exploded view of an antenna assembly in accordance with one embodiment.
Figure 2:
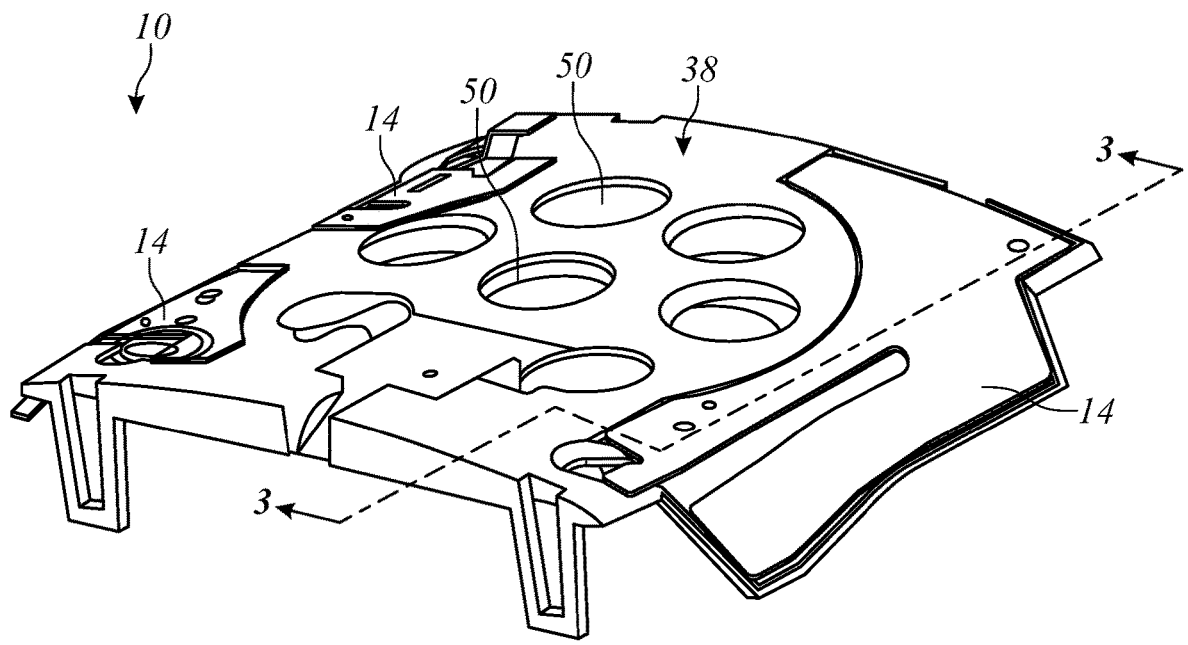
FIG. 2 is a perspective view of the antenna assembly in an assembled state.
Figure 3:
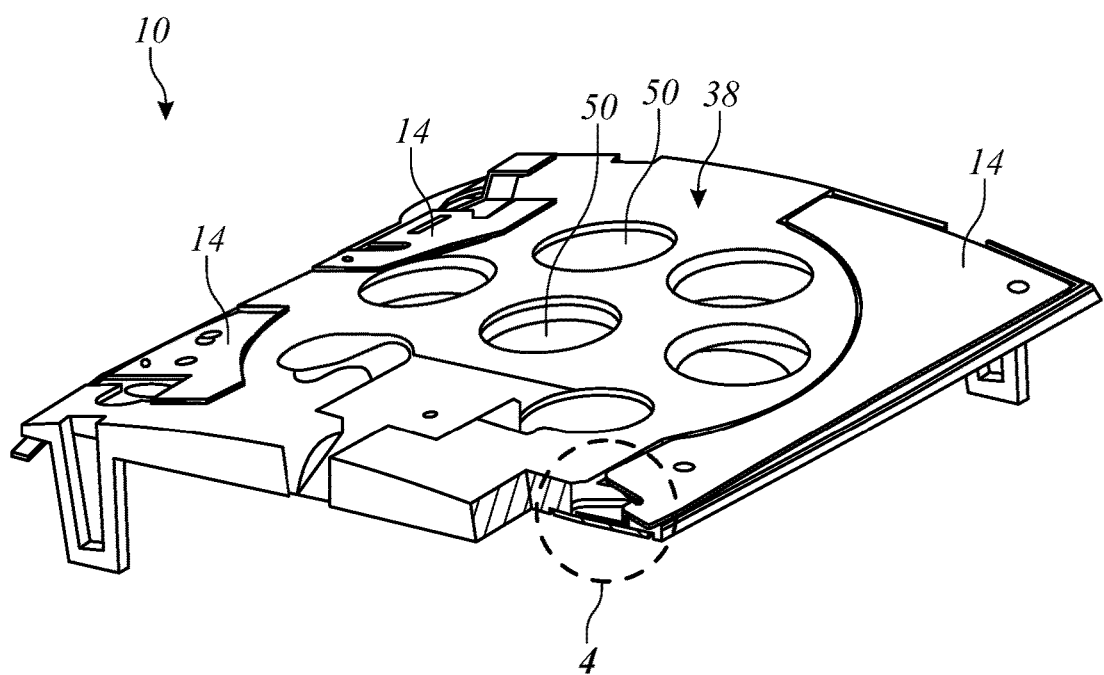
FIG. 3 is a perspective, cross-sectional view of the antenna assembly, taken along lines 3-3 in FIG. 2.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Although antenna elements are often placed within a device housing close to or nearby other components, including components mounted on PCBs, signals received by and transmitted from an antenna may cause electro-magnetic interference with signals processed by components on the PCB. Accordingly, there is a need for an improved antenna assembly for a portable radio in which a compact design may be achieved while still maintaining sufficient spacing to reduce electro-magnetic interference. A design should also maintain a desired level of water resistance.

One embodiment provides an antenna assembly for a portable radio. The antenna assembly includes a removable speaker cover having a plurality of speaker ports and an antenna mounting aperture extending through the removable speaker cover. The antenna assembly also includes a sheet metal antenna element coupled to the removable speaker cover along at least one of a top or side surface of the removable speaker cover. The sheet metal antenna element has a jogged portion that extends into the antenna mounting aperture. The antenna assembly also includes a contact plate disposed below the removable speaker cover and aligned with the antenna mounting aperture. The contact plate is coupled to the jogged portion to provide an electrical connection between the contact plate and the jogged portion.

Another embodiment provides a portable radio with a cosmetic housing. In one instance, the portable radio includes an antenna assembly having a removable speaker cover, the removable speaker cover having a plurality of speaker ports and an antenna mounting aperture extending through the removable speaker cover. The antenna assembly also includes a sheet metal antenna element coupled to the removable speaker cover along at least one of a top or side surface of the removable speaker cover. The sheet metal antenna element has a jogged portion that extends into the antenna mounting aperture. The antenna assembly also includes a contact plate disposed below the removable speaker cover and aligned with the antenna mounting aperture. The contact plate is coupled to the jogged portion to provide an electrical connection between the contact plate and the jogged portion. The portable radio also includes an external cosmetic housing. The sheet metal antenna element is disposed between the contact plate and the external cosmetic housing.

Another embodiment provides method of replacing an antenna for a portable radio includes removing a speaker cover from the portable radio, the speaker cover comprising a sheet metal antenna element coupled thereto, the sheet metal antenna element having a jogged portion with a contact plate coupled thereto. The method also includes attaching a new speaker cover to the portable radio, the new speaker cover having a new sheet metal antenna element coupled thereto, along with a new contact plate coupled to a jogged portion of the new sheet metal antenna element.

FIGS. 1-9 illustrate one example of an antenna assembly 10. In the example illustrated, the antenna assembly 10 includes three separate antenna elements 14, although other embodiments include different numbers of antenna elements 14. Each of the illustrated antenna elements 14 is formed of sheet metal (for example with multiple radio frequency elements), and may be coated with a nickel plating to inhibit or prevent corrosion from water. As illustrated in FIG. 1, each of the antenna elements 14 comprises a sheet metal antenna that may have a non-planar shape, such that the antenna elements 14 are three-dimensional. It is to be appreciated that in some embodiments one or more of the antenna elements 14 may be a planar element (e.g., a flat planar piece of sheet metal).

Figure 4:
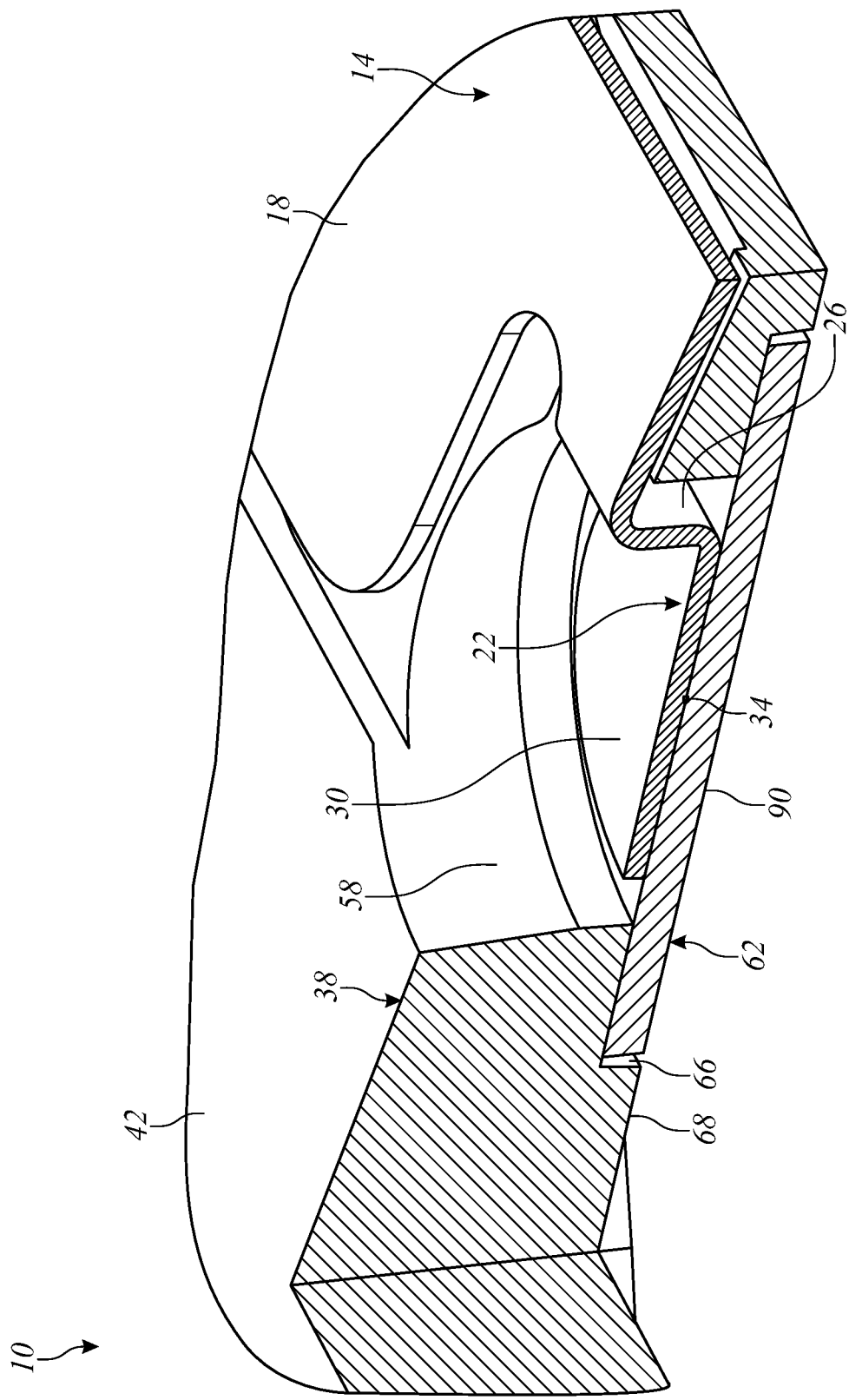
FIG. 4 is an enlarged perspective view of a portion of the cross-section in FIG. 3.

With reference to FIG. 4, each of the antenna elements 14 includes a main body 18, and a jogged portion 22 that extends from the main body 18. The jogged portion 22 includes an arm 26 that extends from the main body 18 (for example at an approximately 90 degree angle as illustrated in FIG. 4), and a contact region 30 that extends from the arm 26 (for example at an approximately 90 degree angle as illustrated in FIG. 4), such that the contact region 30 is generally offset at a distance from the main body 18. As illustrated in FIG. 4, the contact region 30 may have a generally circular shape, and has a planar lower surface 34.

With reference to FIGS. 1-4, the antenna assembly 10 also includes a removable speaker cover 38. In the illustrated embodiment the speaker cover 38 is a plastic structure having a top surface 42 and side surfaces 46 extending from the top surface 42. The speaker cover 38 includes speaker ports 50 that extend through the top surface 42, as well as antenna attachment regions 54 (FIG. 1) disposed along the top and side surfaces 42, 46. As illustrated in FIG. 1, the antenna attachment regions 54 may be recessed regions along the top surface 42 and side surfaces 46, and have shapes and sizes that generally correspond to the antenna elements 14. Adhesive may be applied to the antenna attachment regions 54, and the antenna elements 14 may then be affixed to the antenna attachment regions 54 and so that the antenna elements 14 are coupled to both the top surface 42 and the side surfaces 46 of the speaker cover 38.

As illustrated in FIGS. 1 and 4, the speaker cover 38 also includes antenna mounting apertures 58 that extend through the top surface 42. The mounting apertures 58 are sized and shaped to receive the contact regions 30 of the antenna elements 14. For example, as illustrated in FIG. 4, in the illustrated embodiment the mounting aperture 58 is generally cylindrical in shape. When the antenna element 14 is affixed to the speaker cover 38, the arm 26 extends away from the main body 18 and into the mounting aperture 58. The contact region 30 is disposed within the mounting aperture 58, generally at a lower end of the mounting aperture 58.

With reference to FIGS. 1 and 4, the antenna assembly 10 also includes metal contact plates 62. In the illustrated embodiment each of the metal contact plates 62 is a circular, planar element (for example disk) that is aligned with one of the mounting apertures 58 and is coupled directly (for example via laser welding) to the lower surface 34 of one of the contact regions 30. The metal contact plates 62 provide both mechanical and electrical connections between the metal contact plates 62 and the jogged portions 22.

As illustrated in FIG. 4, the speaker cover 38 may include a recessed area 66 along a lower surface 68 that is sized and shaped to receive the contact plate 62. Thus, during assembly, the antenna element 14 may first be affixed to the top and side surfaces 42, 46 of the speaker cover 38, such that the contact region 30 of the jogged portion 22 extends into the mounting aperture 58. The metal contact plate 62 may then be moved into the recessed area 66, and laser welded to the lower surface 34 of the contact region 30. Other embodiments include different shapes of contact plates 62 and contact regions 30 than that illustrated (for example square, oval, and the like).

Figure 5:
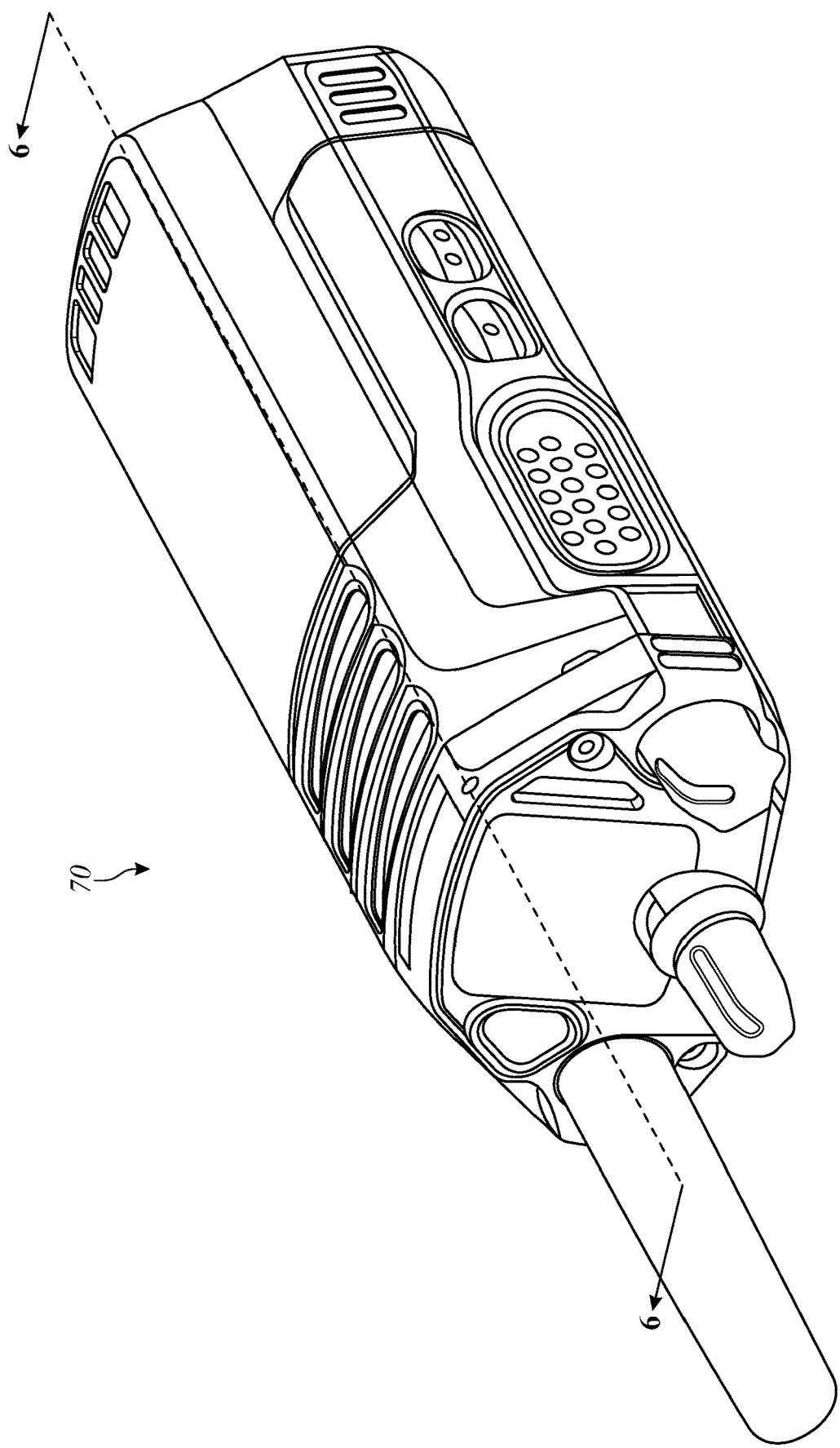
FIG. 5 is a perspective view of a portable radio device having the antenna assembly of FIG. 1.
Figure 6:
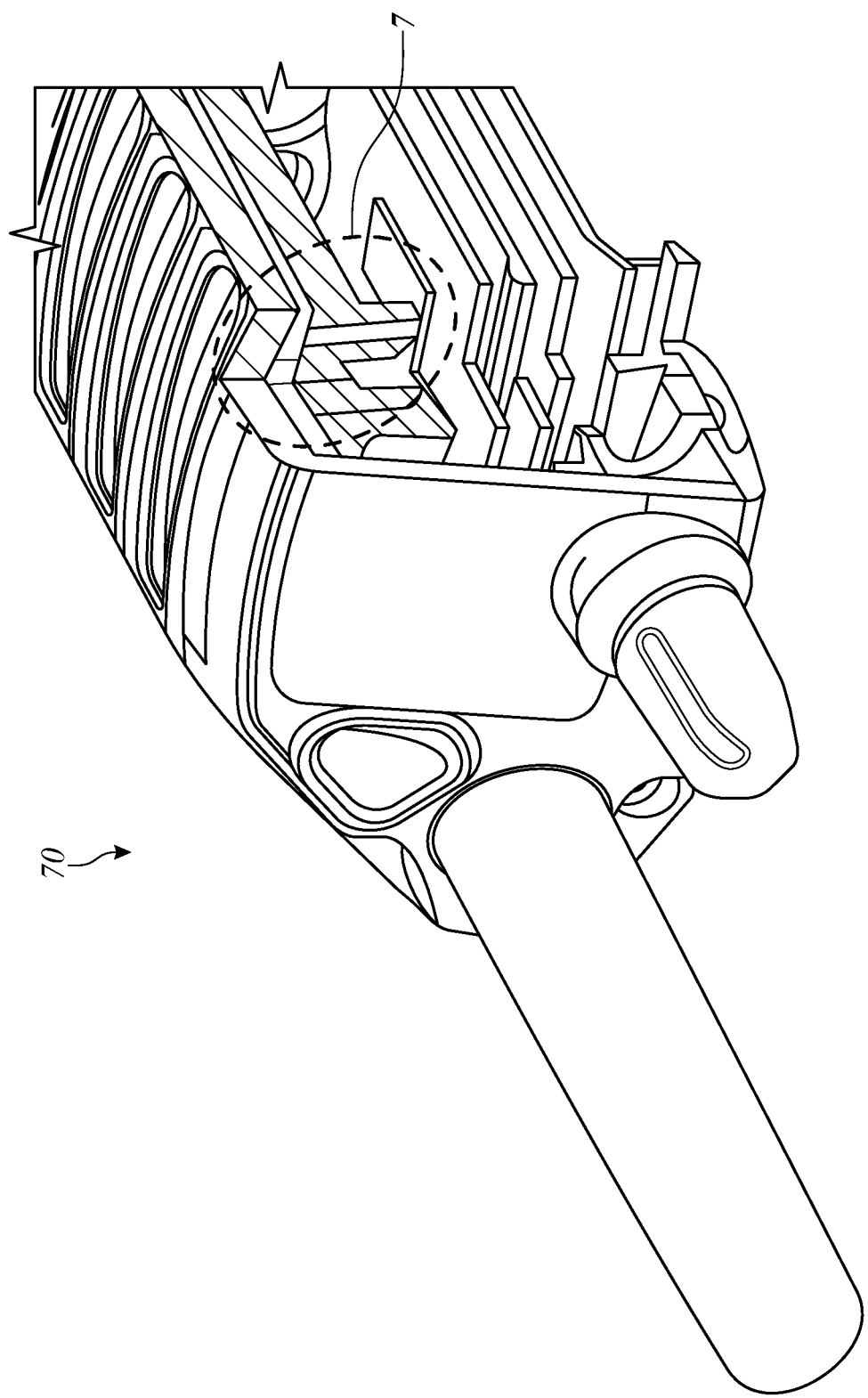
FIG. 6 is a partial cross-sectional view of the portable radio device, taken along lines 6-6 in FIG. 5.
Figure 7:
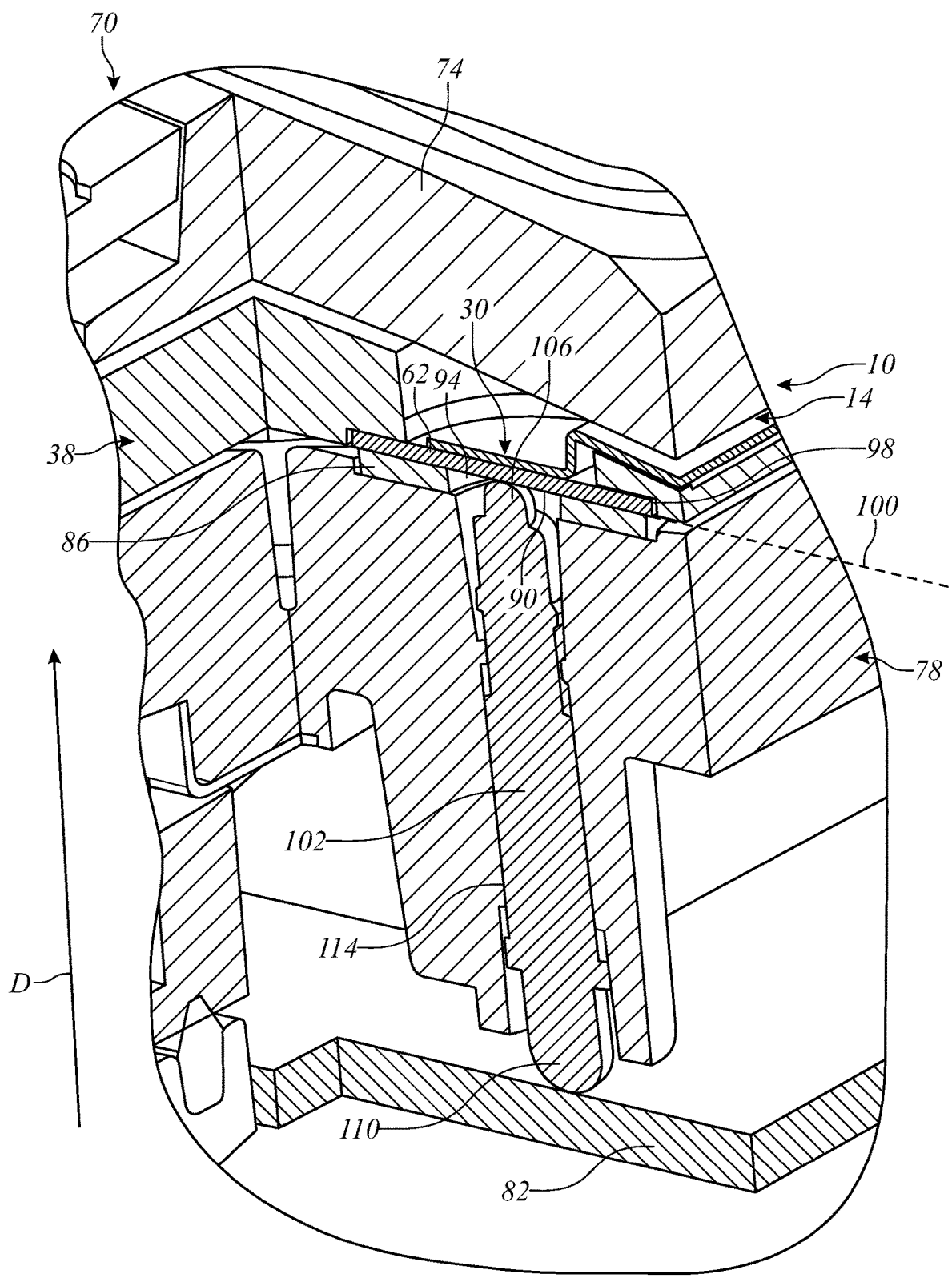
FIG. 7 is an enlarged perspective view of a portion of the cross-section in FIG. 6.

With reference to FIGS. 5-7, the antenna assembly 10 may be utilized within a portable radio device 70. For example, as illustrated in FIG. 7, the radio device 70 includes an exterior housing 74 (for example an external cosmetic housing), a speaker assembly 78 disposed underneath the exterior housing 74, and a printed circuit board (PCB) 82 disposed also underneath the speaker assembly 78. The antenna assembly 10 may be positioned such that the speaker cover 38 is disposed between the exterior housing 74 and the speaker assembly 78 along a thickness direction D of the device 70.

With continued reference to FIG. 7, the antenna assembly 10 includes a sealing element 86 coupled to a bottom 90 of the contact plate 62, such that the contact plate 62 is disposed between the sealing element 86 and the jogged portion 22 of the antenna element 14. The sealing element 86 may be coupled to both a top of the speaker assembly 78 and the bottom 90 of the contact plate 62. The sealing element 86 includes an aperture 94 extending through the sealing element 86 to provide access to the bottom 90 of the contact plate 62. The sealing element 86 is disposed between the speaker assembly 78 and the contact plate 62, and provides a water-tight seal between the speaker assembly 78 and the contact plate 62. The sealing element 86 may be an adhesive ring, gasket, or other sealing structure. As illustrated in FIG. 7, the speaker assembly 78 may include a recess 98 that is shaped and sized to receive the sealing element 86, such that the sealing element 86 is generally constrained along a top of the speaker assembly 78 and centered underneath the contact plate 62.

With continued reference to FIG. 7, the sealing elements 86 form a sealing boundary 100 of the device 70. The antenna elements 14 are disposed entirely on a wet side of the sealing boundary 100 (above the sealing boundary 100 in FIG. 7), whereas the speaker assembly 78 and the PCB 82 are disposed on a dry side of the sealing boundary 100 (below the sealing boundary 100 in FIG. 7). By allowing the antenna elements 14 to be placed on the wet side of the device 70, the antenna elements 14 may be placed farther away from the PCB 82 to improve functionality of the antenna elements 14, without impacting product size of the device 70.

With continued reference to FIG. 7, the antenna assembly 10 also includes a pogo connector 102 (or other connector) that provides an electrical connection between the antenna element 14 and the PCB 82. The pogo connector 102 extends in an elongate manner along the thickness direction D and has a top end 106 and a bottom end 110. The top end 106 extends through the aperture 94 of the sealing element 86, and is in physical and electrical contact with the bottom 90 of the contact plate 62. The bottom end 110 of the pogo connector 102 is in physical and electrical contact with a top of the PCB 82. As illustrated in FIG. 7, the pogo connector 102 extends through an aperture 114 of the speaker assembly 78.

Figure 8:
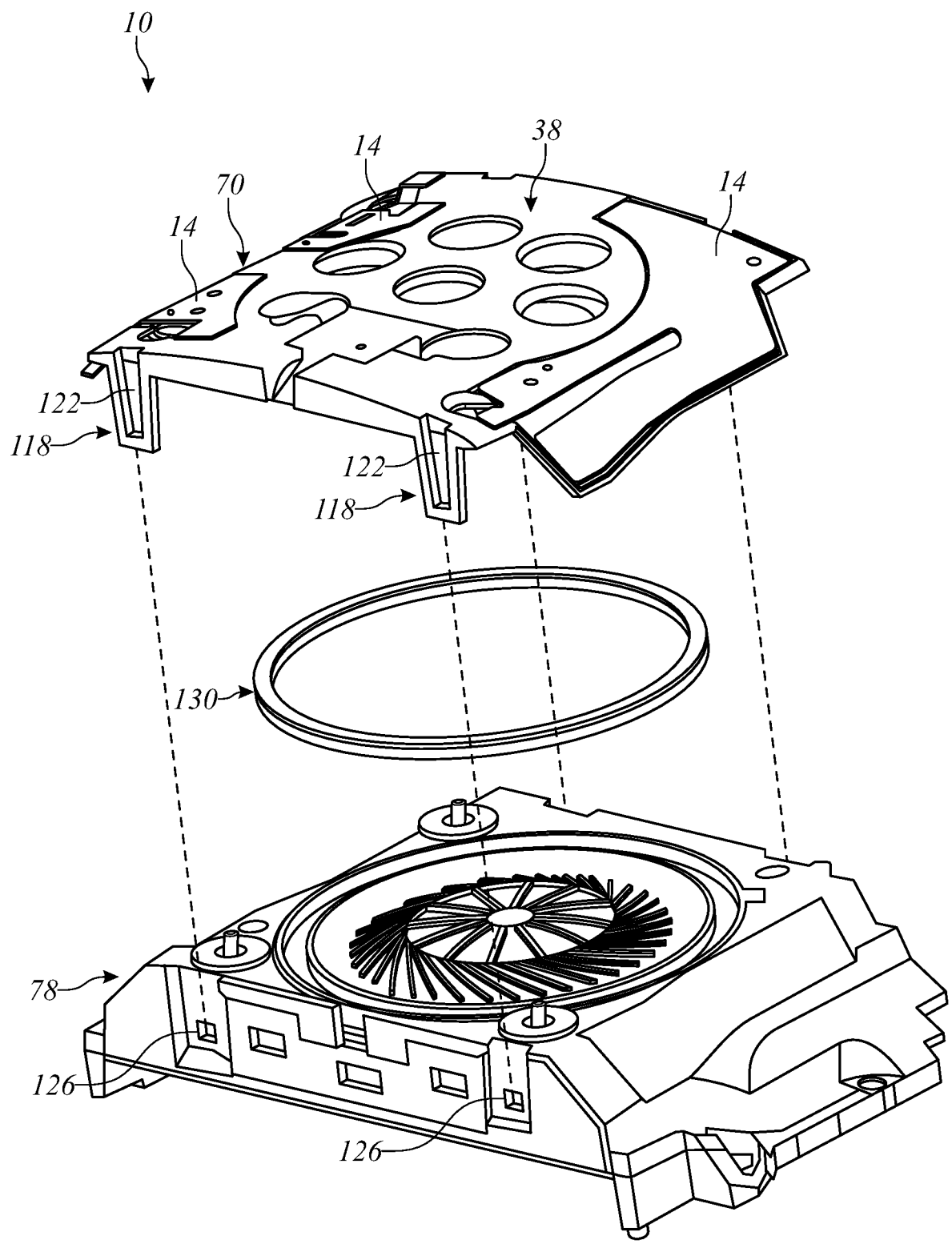
FIG. 8 is a perspective, exploded view of a speaker and antenna assembly of the portable radio device.
Figure 9:
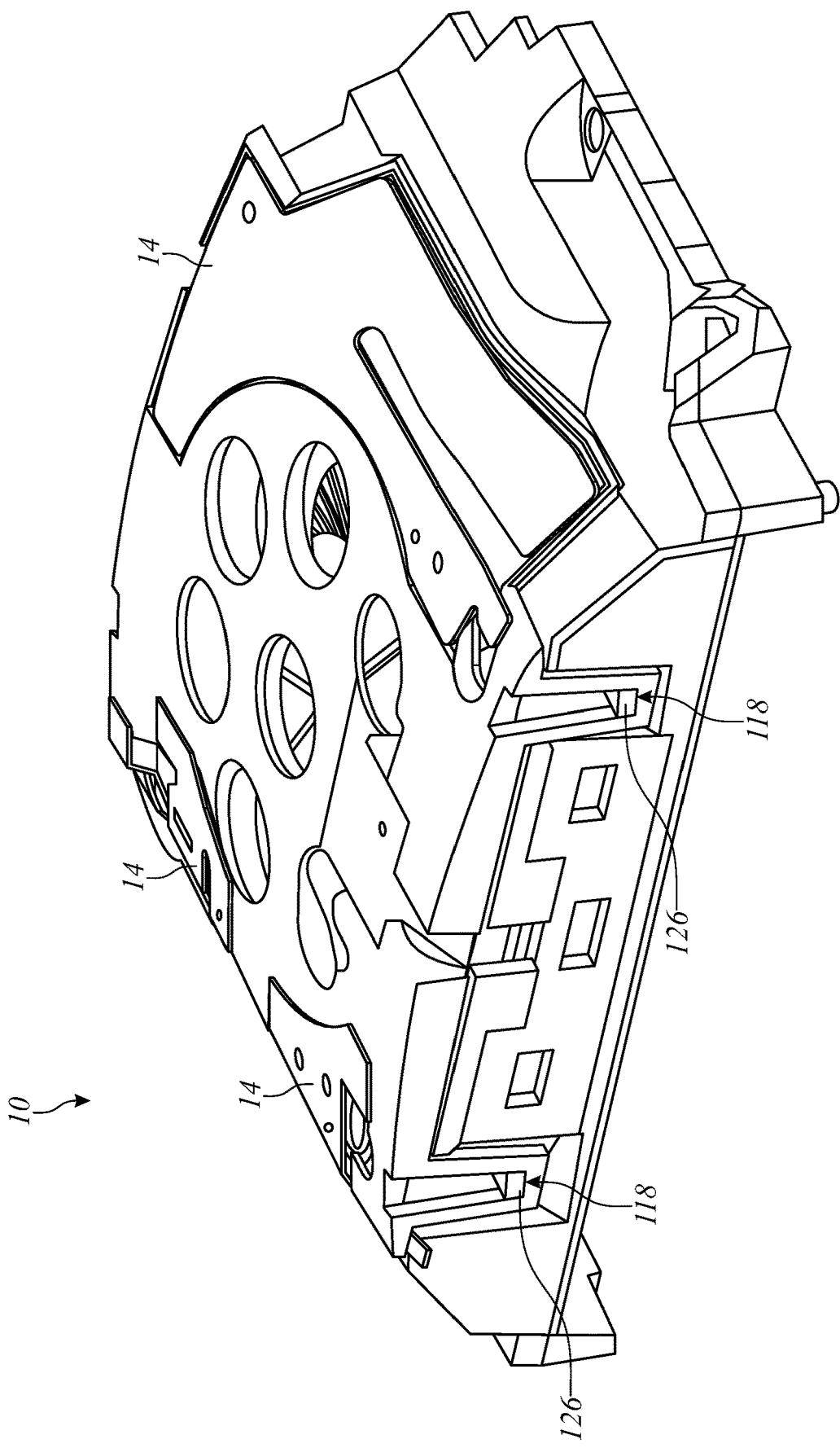
FIG. 9 is a perspective view of the speaker and antenna assembly in an assembled state.

With reference to FIGS. 8 and 9, and as noted above, the speaker cover 38 is a removable speaker cover 38. Accordingly, the speaker cover 38 includes attachment features 118 that are integrally formed as part of the speaker cover 38 to enable a snap-on attachment of the speaker cover 38 to the speaker assembly 78. In the illustrated embodiment the attachment features 118 are flexible legs each having an aperture 122 therein. The speaker assembly 78 includes corresponding protrusions 126. To couple the speaker cover 38 to the speaker assembly 78, the speaker cover 38 is pressed down until the attachment features 118 snap over the protrusions 126, and the protrusions 126 are captured within the apertures 122 of the flexible legs. Other embodiments include various other attachment mechanisms (for example detents, clamp elements, and the like).

When the speaker cover 38 is coupled to the speaker assembly 78, the speaker cover 38 provides sufficient compressive force to provide an acoustic seal between the speaker assembly 78 and the speaker cover 38. For example, as illustrated in FIG. 8, the speaker assembly 78 may include a speaker seal 130. When the speaker cover 38 is pressed down onto the speaker assembly 78, the speaker seal 130 forms a seal between the speaker cover 38 and the speaker assembly 78.

With continued reference to FIGS. 8 and 9, the speaker cover 38 and its attached antenna elements 14 may easily be removed from the device 70, so that a new speaker cover 38' and new antenna elements 14' (for example with different radio frequency characteristics such as WiFi, Bluetooth®, GPS, LTE and the like) may be inserted and used in the device 70. For example, the snap-on connection of the attachment features 118 and the protrusions 126 may be disengaged, and the speaker cover 38 may then be pulled away. During this removal the bottoms 90 of the contact plates 62 disengage from the sealing elements 86, and the speaker cover 38 disengages from the speaker seal 130. In some embodiments the same speaker seal 130 and/or sealing elements 86 may be used with the new speaker cover 38' and antenna elements 14'.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. An antenna assembly for a portable radio, the antenna assembly comprising:
    a removable speaker cover having a plurality of speaker ports and an antenna mounting aperture extending through the removable speaker cover;
    a sheet metal antenna element coupled to the removable speaker cover along at least one of a top or side surface of the removable speaker cover, the sheet metal antenna element having a jogged portion that extends down into the antenna mounting aperture; and
    a contact plate disposed below the removable speaker cover and aligned with the antenna mounting aperture, wherein the contact plate is coupled to the jogged portion to provide both a mechanical and electrical connection between the contact plate and the jogged portion.

2. The antenna assembly of claim 1, further comprising a sealing element coupled to a bottom of the contact plate, such that the contact plate is disposed between the sealing element and the jogged portion of the sheet metal antenna element.

3. The antenna assembly of claim 2, wherein the sealing element includes an aperture extending through the sealing element to provide access to the bottom of the contact plate.

4. The antenna assembly of claim 3, further comprising a connector in electrical contact with the bottom of the contact plate.

5. The antenna assembly of claim 2, wherein the sealing element is an adhesive ring.

6. The antenna assembly of claim 2, wherein the sealing element is disposed between a speaker assembly and the contact plate, and provides a water-tight seal between the speaker assembly and the contact plate.

7. The antenna assembly of claim 2, wherein the sealing element forms a sealing boundary, wherein the sheet metal antenna element is disposed entirely on a wet side of the sealing boundary, and wherein a speaker assembly and a printed circuit board are disposed entirely on a dry side of the sealing boundary.

8. The antenna assembly of claim 1, wherein the antenna mounting aperture is one of a plurality of antenna mounting apertures, wherein the sheet metal antenna element is one of a plurality of sheet metal antenna elements, and wherein the contact plate is one of a plurality of contact plates, wherein each of the sheet metal antenna elements is separately spaced from the other sheet metal antenna elements and includes a jogged portion that extends into one of the antenna mounting apertures, and wherein each of the jogged portions is coupled to one of the contact plates.

9. The antenna assembly of claim 1, further comprising a speaker assembly, wherein the removable speaker cover includes a plurality of attachment features integrally formed as part of the removable speaker cover to enable attachment of the removable speaker cover to a speaker assembly.

10. The antenna assembly of claim 9, wherein when the removable speaker cover is coupled to the speaker assembly, the removable speaker cover provides sufficient compressive force to provide an acoustic seal between the speaker assembly and the removable speaker cover.

11. The antenna assembly of claim 1, wherein the sheet metal antenna element extends along and is adhesively coupled to both the top surface and side surface of the removable speaker cover.

12. The antenna assembly of claim 1, wherein the sheet metal antenna element includes a main body, wherein the jogged portion includes an arm extending from the main body and into the antenna mounting aperture.

13. The antenna assembly of claim 12, wherein the jogged portion further includes a planar element coupled to an end of the arm, wherein the planar element is coupled to the contact plate.

14. The antenna assembly of claim 13, wherein the planar element is electrically connected to the contact plate.

15. The antenna assembly of claim 1, wherein the sheet metal antenna element is multi-planar.

16. The antenna assembly of claim 1, wherein the contact plate is a planar disk.

17. The antenna assembly of claim 1, wherein the jogged portion includes an arm having a first end and a second end, wherein the jogged portion includes a disk coupled to the second end of the arm, wherein the arm is bent between the first end and the second end such that the first end extends in a first plane, and the disk extends in a second plane that is offset from the first plane.

18. A portable radio comprising:
an antenna assembly comprising:
a removable speaker cover having a plurality of speaker ports and an antenna mounting aperture extending through the removable speaker cover;
a sheet metal antenna element coupled to the removable speaker cover along at least one of a top or side surface of the removable speaker cover, the sheet metal antenna element having a jogged portion that extends into the antenna mounting aperture; and
a contact plate disposed below the removable speaker cover and aligned with the antenna mounting aperture, wherein the contact plate is coupled to the jogged portion to provide an electrical connection between the contact plate and the jogged portion;
an external cosmetic housing, wherein the sheet metal antenna element is disposed between the contact plate and the external cosmetic housing;
a printed circuit board, and a connector coupled to both a top of the printed circuit board and a bottom of the contact plate; and
a speaker assembly, and a sealing element coupled to both a top of the speaker assembly and the bottom of the contact plate.

19. The portable radio of claim 18, wherein the sealing element includes an aperture, and wherein a portion of the connector extends through the aperture of the sealing element to contact the bottom of the contact plate.

20. The portable radio of claim 18, wherein the sheet metal antenna element is multi-planar.

21. An antenna assembly for a portable radio, the antenna assembly comprising:
a removable speaker cover having a plurality of speaker ports and an antenna mounting aperture extending through the removable speaker cover;
a sheet metal antenna element coupled to the removable speaker cover along at least one of a top or side surface of the removable speaker cover, the sheet metal antenna element having a jogged portion that extends into the antenna mounting aperture;
a contact plate disposed below the removable speaker cover and aligned with the antenna mounting aperture, wherein the contact plate is coupled to the jogged portion to provide both a mechanical and electrical connection between the contact plate and the jogged portion; and
a sealing element coupled to a bottom of the contact plate, such that the contact plate is disposed between the sealing element and the jogged portion of the sheet metal antenna element.

22. The antenna assembly of claim 21, wherein the sealing element includes an aperture extending through the sealing element to provide access to the bottom of the contact plate.

23. The antenna assembly of claim 21, wherein the sealing element is an adhesive ring.

24. The antenna assembly of claim 21, wherein the jogged portion includes an arm having a first end and a second end, wherein the jogged portion includes a disk coupled to the second end of the arm, wherein the arm is bent between the first end and the second end such that the first end extends in a first plane, and the disk extends in a second plane that is offset from the first plane.

25. The antenna assembly of claim 21, wherein the sealing element forms a sealing boundary, wherein the sheet metal antenna element is disposed entirely on a wet side of the sealing boundary, and wherein a speaker assembly and a printed circuit board are disposed entirely on a dry side of the sealing boundary.

* * * * *